INVENTORS F. T. CYRSKY, JR.
C. B. HAEHNER, JR.
BY
ATTORNEY

Nov. 12, 1968　　　F. T. CYRSKY, JR., ET AL　　　3,410,405
APPARATUS FOR DETECTING COLORED MATERIALS
Filed April 23, 1965　　　　　　　　　　　　　6 Sheets-Sheet 4

United States Patent Office 3,410,405
Patented Nov. 12, 1968

3,410,405
APPARATUS FOR DETECTING
COLORED MATERIALS
Frank Theodore Cyrsky, Jr., Warren Township, Somerset County, and Carl Bernard Haehner, Jr., Raritan Township, Hunterdon County, N.J., assignors to Western Electric Company, Incorporated, New York, N.Y., a corporation of New York
Filed Apr. 23, 1965, Ser. No. 450,348
13 Claims. (Cl. 209—111.6)

The present invention relates to apparatus for identifying colored materials and more particularly, although not exclusively, to electro-optical means for identifying colored articles.

The demand for consumer goods and services at an unprecedented rate is a primary factor for relentless pursuit by industry to perfect more refined, faster, and less costly production and inspection techniques. Inferior products and/or slow production rates can often be attributed directly to manual operations requiring maximum concentration. With the advent of increases in production requirements, existing manufacturing techniques must give way to new concepts of machine control and inspection.

Certain physical characteristics of products have been detected in the past by electro-optical systems. Even though photoelectric circuits have been employed extensively in industry in the past, more recent refinements in the basic principles employed in conventional photoelectric circuits have given rise to more sophisticated systems which show considerable promise in selective fields of automated control and promise ready means for 100 percent inspection of items being manufactured or sorted.

The improved photoelectric systems utilize the varying degrees of intensity and frequency of incident light and possess rather extensive analytical capabilities which permit identifying selected colored objects. This approach has lead to areas where automation has heretofore been improbable. In general, these applications require means for performing the combined efforts of an operator's eyes and the analytical capabilities of the operator's brain to perform such functions as color-monitoring.

Color selection or identification functions are integral parts of many manufacturing processes and without mechanized means for selecting colors, complete automation of such processes is not possible. One example of the need for color selection is in the manufacture of electrical cords for telephone handsets.

It is customary in telephone handsets for two of the conductors of the telephone cord to extend through the handle of the handset between the earpiece and the mouthpiece. These two conductors are longer than the remaining conductors of the cord. One particular line cord associated with a certain type of handset contains six, color-coded conductors. This cord extends from the handset to a connector block. The insulation on the six conductors are red, white, black, blue, green, and yellow. The blue and yellow conductors are selected to be longer than the remaining conductors and are longer because of the longer path they must traverse in the connector block.

In the manufacture of telephone cords, individually insulated, color-coded, tinsel conductors are stranded together and a jacket is pressure extruded or tubed around the conductors in one operation to form an indefinite length of cordage. Sections of the cordage of predetermined lengths are cut from the indefinite length of multi-conductor cordage to form individual cords. The outer section of the jacket is severed a few inches from the end of the section of the cordage. The severed sections of the jacket are stripped off the conductors on the ends of the cordage to expose the individual conductors. The conductors on one end of the cord are then cut to different lengths, depending upon the color of each of the conductors, and solderless, spade tips are then crimped on the ends of the conductors to form electrical terminations on the ends of the tinsel conductors.

Currently, operators perform the color-selecting function in the cord manufacturing process. The operators identify the various conductors visually and adjust the blue and yellow conductors to their individually required lengths prior to tipping and banding of the cordage in a semiautomatic tipping and banding apparatus.

Automatic manufacture of telephone cords is only possible if the different colored conductors can be identified with a high degree of accuracy. This requires a detection system which is responsive to frequency content of reflected light resulting because of the product having the property of reflecting discrete bands of these frequencies.

An electro-optical device embodying certain novel features of the present invention has been developed which will automatically monitor the automatic cord manufacturing operation, select the blue and yellow conductors for automatic length control to permit automatic termination of the telephone cords, and reject all cords which do not conform to a preselected standard.

It is an object of the present invention to provide apparatus for discriminating between different colored media or elements.

Another object of the present invention is to provide an electro-optical, color-discriminating system utilizing an unbiased, photosensitive, electronic tube which generates a current that is dependent on the difference in the amount of light from objects shining on two opposed, photoemissive electrode surfaces of the tube.

A further object of the present invention is to provide light filters of predetermined characteristics through which light of predetermined frequency bands, from colored objects to be identified, are directed onto preselected photomissive electrodes of an unbiased photomissive tube to generate a current having a direction and a magnitude which are dependent on the colors of the elements being observed.

A still further object of the present invention is to provide an electro-optical, color-discrimination system which will detect the elements of the desired color of a group of colored elements and store information regarding the relative sequential positions of the particular colored elements.

Other objects and features of the present invention will be more readily understood from the following detailed description of a specific embodiment thereof when read in conjunction with the accompanying drawings, in which.

Figure 7:
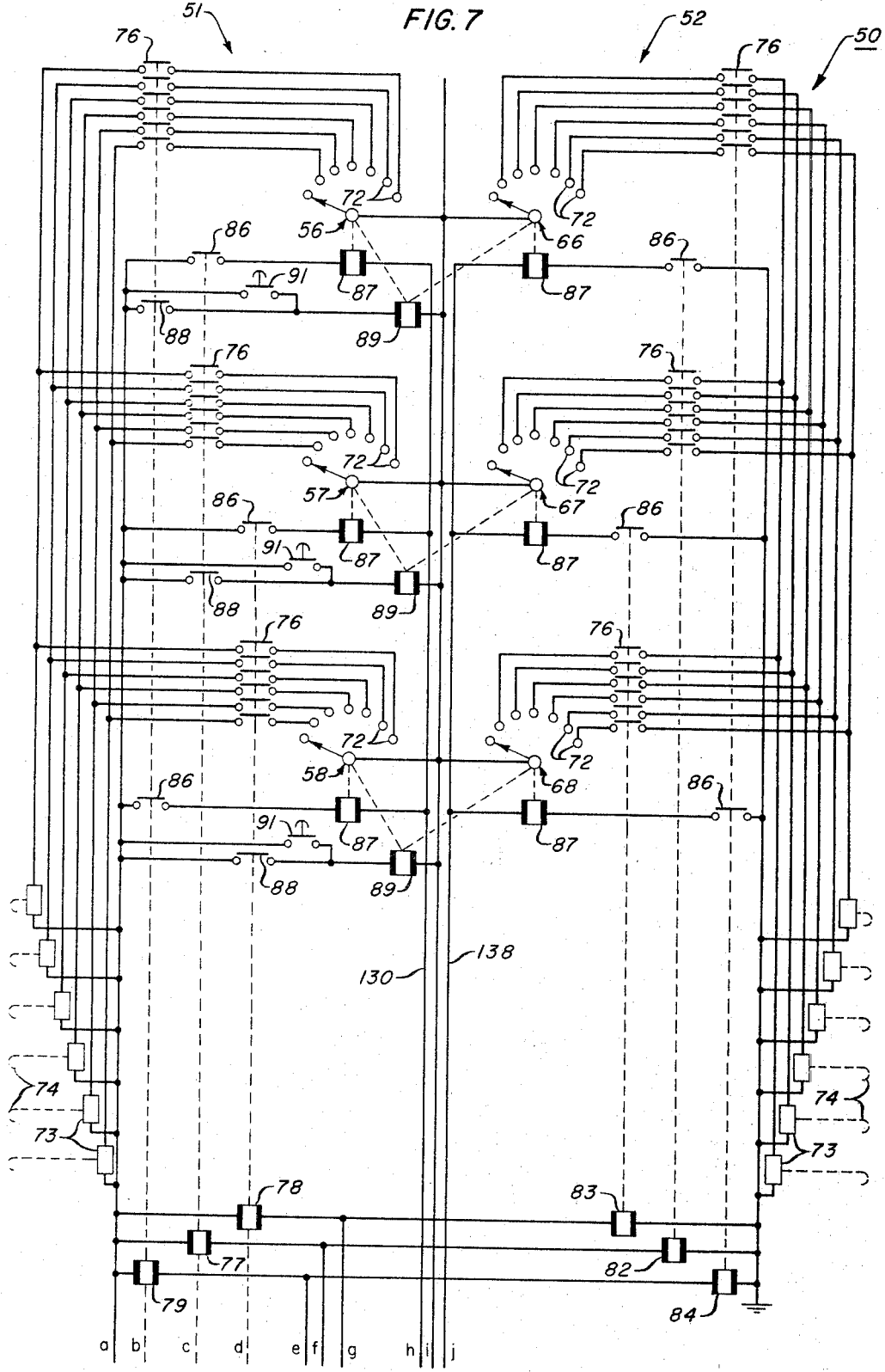
Figure 8:
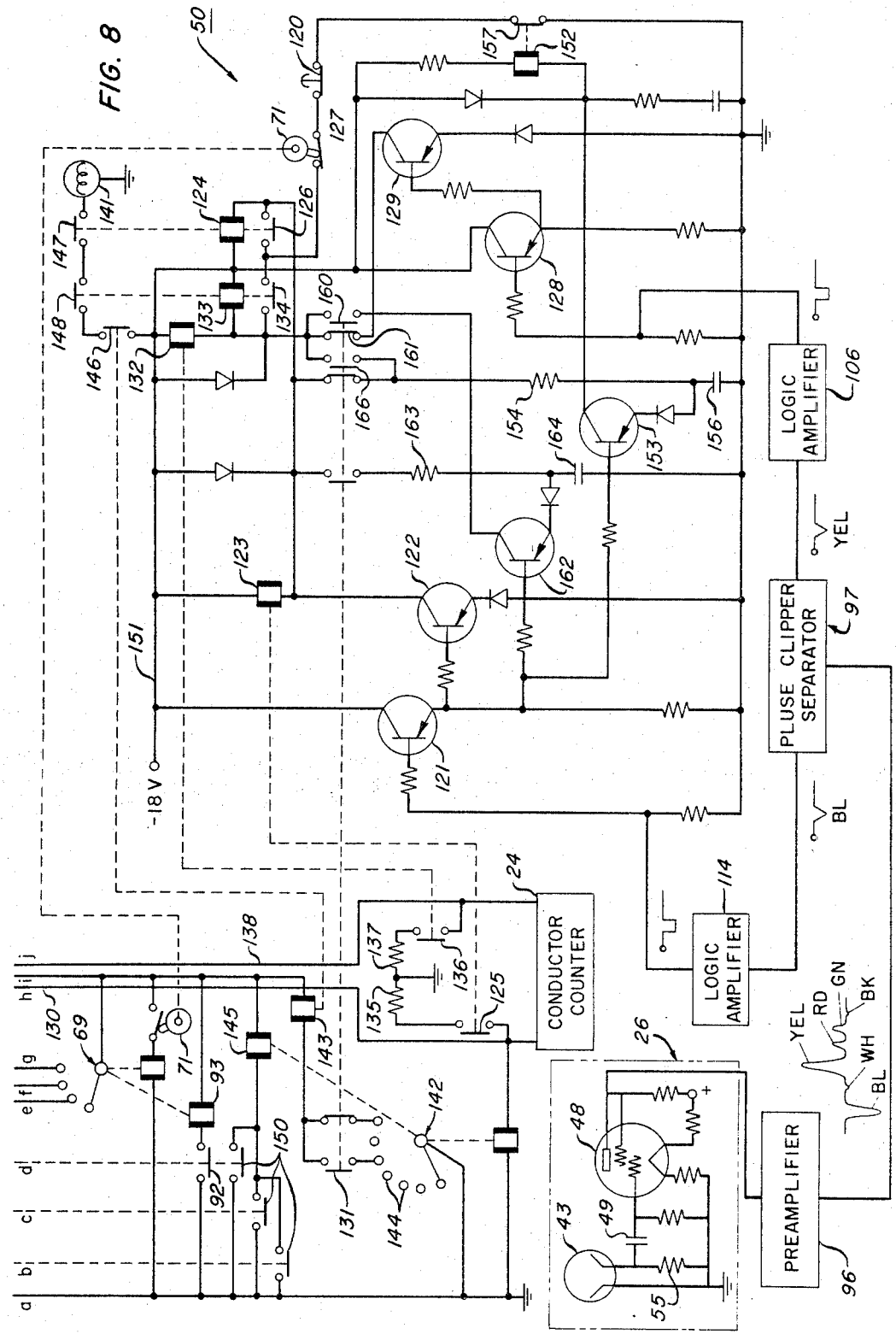
Figure 9:
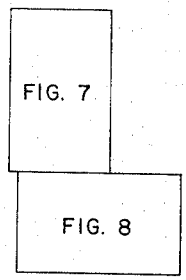

FIGS. 7 and 8, together, constitute a schematic diagram of a specific electrical control system and logic storage system for the cord-processing apparatus;

FIG. 9 is a diagram showing the manner in which

FIGS. 7 and 8 are arranged to form a complete circuit; and

Figure 10:
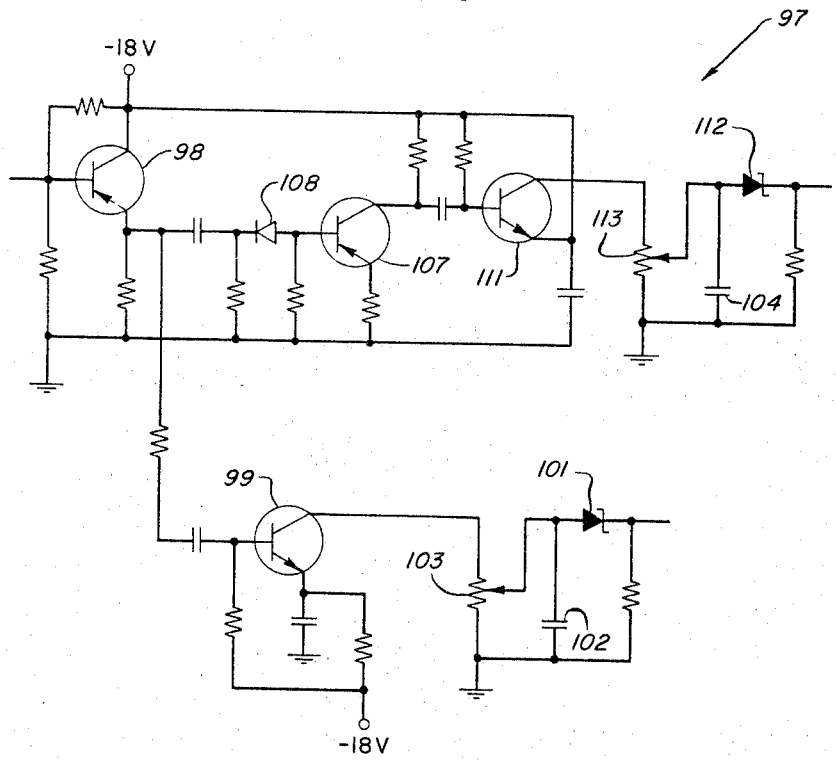

FIG. 10 is a detailed schematic diagram of an electrical circuit of a pulse-clipper-separator unit forming a part of the electrical control system.

Figure 1:
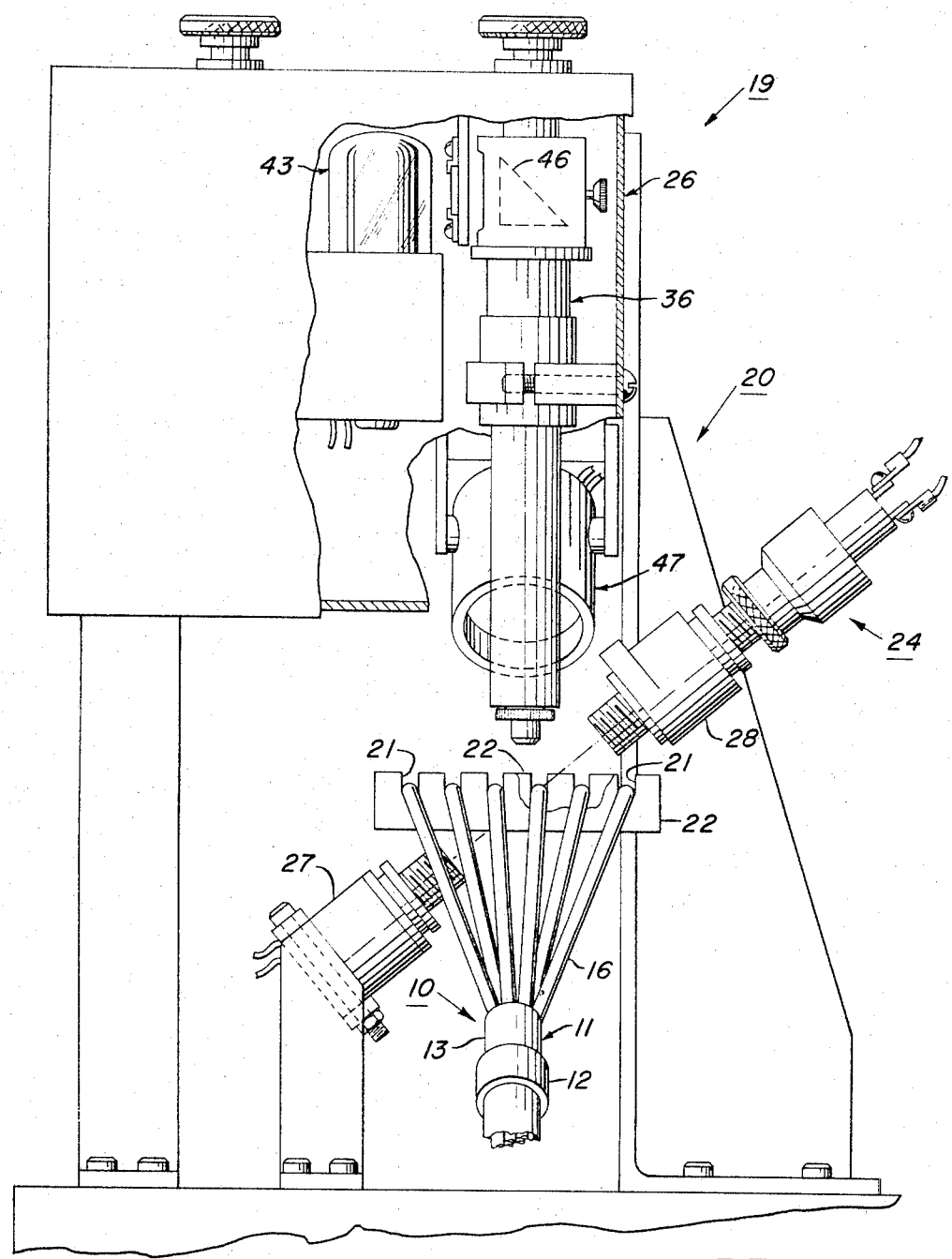
FIG. 1 is a front elevational view of a conductor-counting and color-sensing station of an automatic cord-processing apparatus.

Referring now to the drawings and more particularly to FIG. 1 thereof, there is shown a telephone cord, designated generally by the numeral 10, which includes a section of jacketed cordage, designated generally by the numeral 11, from which a short section (not shown) of the jacket 13 has been removed from the end thereof and a metal stay band 12 has been applied to the remaining end of the jacket 13 in a previous operation. Six individual conductors 16—16 of the cord 10 are insulated with red, white, black, blue, green, and yellow polyvinyl chloride insulating compounds.

A cord-processing apparatus, designated generally by the numeral 20 (FIG. 1) is designed so that the individual cords 10—10 may be indexed successively from one station to another station in a series of intermittent operations.

The individual conductors 16—16 are moved transversely of a conductor-counting and color-sensing station, designated generally by the numeral 19 and illustrated in FIG. 1, by a pair of conductor fanning combs 22—22 while the cord 10 is in motion between work stations (not shown) on opposite sides of the conductor-counting and color-sensing station.

Each of the cords 10—10 arrives at the conductor-counting and color-sensing station 19 with the ends of the individual conductors 16—16 occupying separate slots 21—21 in the fanning combs 22—22. The locations of the several different colored conductors 16—16 of the cord 10 in the combs 22—22 are unknown at this time. The position of the blue and yellow conductors 16—16 in the particular pair of combs 22—22 are determined by the use of a photoelectric, conductor counter, designated generally by the numeral 24 (FIG. 1), and a photoelectric color-sensing head, designated generally by the numeral 26.

The photoelectric counter 24 is employed to count the conductors 16—16 as the individual conductors 16—16 are moved past the counter 24 by the combs 22—22 and the photoelectric color-sensing head 26 detects the color of the insulation on the individual conductors 16—16.

The counter 24 is a photoconductive type which employs a light-sensitive resistor 27, such as a Clairex type CL-403 Cadmium Selenide Cell, as a detecting element. A light source 28 associated with the counter 24 is provided with a lens system (not shown) for directing the light from the light source 28 onto the light-sensitive resistor 27 and is arranged so that the conductors 16—16 act as shutters for the counter 24 as the conductors 16—16 are moved past the counter 24 by the combs 22—22.

The movement of the successive conductors 16—16 between the light source 28 and the light-sensitive resistor 27 interrupts the beam of light from the light source 28. The interruption of the light beam causes the resistance of the resistor 27 to increase and change the bias to the base of a transistor (not shown) and which, in turn, causes an electrical signal to be generated by the counter 24.

Figure 2:
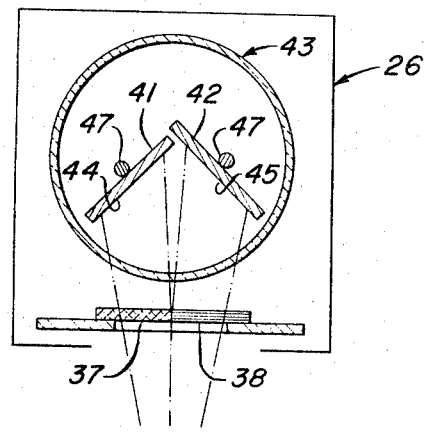
FIG. 2 is an enlarged horizontal sectional view of a phototube and associated color-discriminating filters of a color-sensing head of the cord-processing apparatus.

The electro-optical color-sensing head 26 is provided with a focusing lens system 36 which consists of an objective lens and an eyepiece lens of a microscope. Since light lost through the lens system 36 is directly proportional to the square of the magnifying power, the magnification of the lens system 36 has purposely been kept to a relatively low value of less than five power. The principal purpose of the lens system 36 is to collect and form the light rays, which are reflected from the conductors 16—16, and direct these rays through discriminating filters 37 and 38 (FIG. 2) onto a pair of opposed photoemissive plates 41 and 42 of a photodetector tube, designated generally by the numeral 43.

It is desirable for the path of the light from the conductors 16—16 to be well defined and accurately positioned as it passes through the filters 37 and 38 in the color-sensing head 26. The images of the conductors 16—16 are purposely defocused by the lens system 36 to minimize a glare condition which may exist because of an agent on the insulation on the conductors. The agent is applied to the individual, insulated conductors 16—16 prior to the jacketing operation to minimize the tendency of the conductors to stick together and to the jacket 13 during the extrusion operation in which the cordage jacket 13 is extruded over the stranded conductors 16—16. The agent also facilitates stripping of the section of the jacket 13 from the cordage 11.

The lens system 36 also restricts the field of view at the plane containing the portions of the conductors 16—16 being observed to a circle whose diameter is less than one-tenth of an inch. This limits the time that the images of the individual conductors 16—16 are shining on the plates 41 and 42 of the photodetector tube 43. This is done because the shape and width of the pulse is a direct function of the time the light is shining on the plates 41 and 42. Also, since the individual conductors 16—16 are separated by only 0.187 inch, any wider field of view would permit reflection from adjacent conductors 16—16 to enter the light path thus reducing the signal to noise ratio of the system.

A reflecting prism 46 (FIG. 1), located just above the eyepiece of the microscope forming the lens system 36, deviates the light path through 90 degrees. The reflecting prism 46 redirects the light rays from the conductors 16—16 in such a manner that, for the specific direction of travel of the conductors, the reflected images of the conductors are caused to sweep vertically along the longitudinal direction of the optical tube 43, parallel to the junction of the plates 41 and 42 thereof.

An incandescent tungsten lamp is usually considered as an acceptable source of white light even though it does not contain equal amounts of all the frequencies which comprise the visible spectrum. The conductors 16—16 are preferably illuminated by a 40-watt iodine cycle lamp, designated generally by the numeral 47. A double, convex, condensing lens (not shown) is used to focus the image of the filament of the lamp 47 onto the individual conductors 16—16. An extended helical configuration of the filament in the lamp 47 makes it ideal for the application since the area of uniform illumination is considerably more extensive than the area encompassed by the field of view of the focusing lens system 36.

Figure 3:
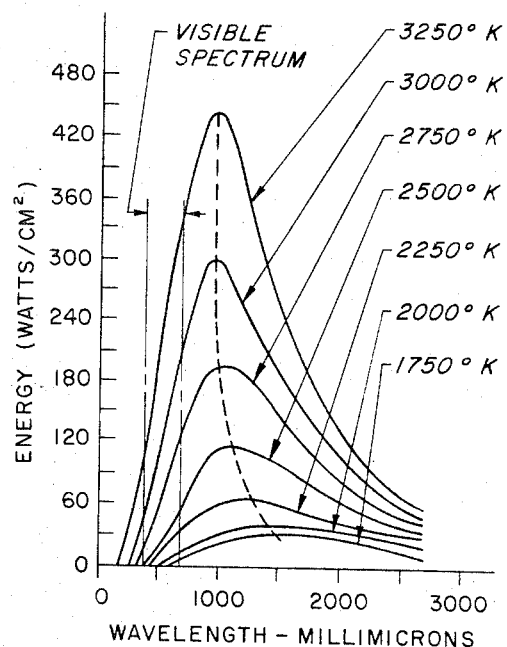
FIG. 3 is a set of curves illustrating the energy output of a tungsten filament as a function of the temperature of the filament.
Figure 5:
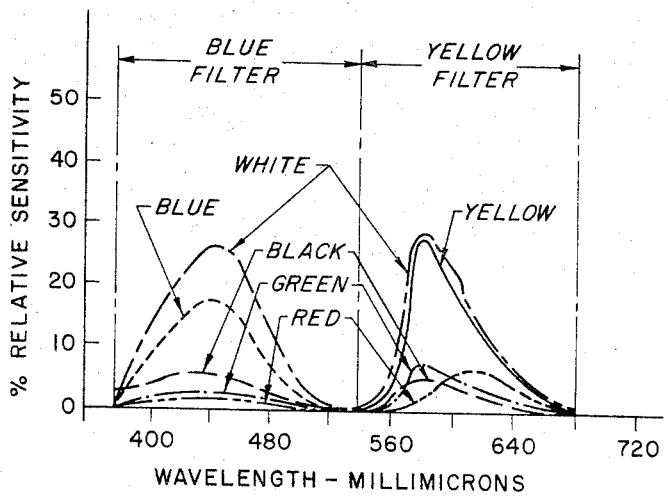
FIG. 5 is a set of curves illustrating the system responses of the cathodes of the phototube, the filters and colored conductor of a specific cord to be processed.

As a general rule, the illumination sources should be selected on the basis that they operate at full voltage rather than attempting to control the light level by varying the power input to the lamp. The lamp 47 is of a special construction so that it can be operated at temperatures in excess of 3100° K. which is somewhat higher than conventional tungsten filament lamps normally operate. This increase in operating temperature and voltage assures some margin of safety in the amount of radiation energy which is available for system operation over and above that which is available with conventional tungsten filament lamps. The operating characteristics of the lamp 47 is illustrated in FIG. 3.

The lens system 36 and filaments 37 and 38 both absorb moderate amounts of energy thereby reducing the amount of energy which would normally be available for system operation. The percentage of reflectance of each of the conductors 16—16 is also a factor which markedly affects the amount of energy which ultimately reaches the plates 41 and 42 of the tube 43 of the color-sensing head 26. These reflectance percentages are as low as fifty percent for the blue conductor 16 and somewhat higher for the yellow conductor 16.

The tube 43 is a photoemissive cell more commonly known as a phototube. The tube 43 is a standard phototube (RCA-5652) of the type disclosed in Ives Patent 1,837,365, which was developed for facsimile use but is utilized here in an unconventional manner.

The tube 43 differs somewhat from conventional tube configuration and operating characteristics. Rather than containing a single anode and a single cathode, the tube has two photoemissive surfaces 44 and 45 on the plates 41 and 42, respectively, which are located at right angles to each other. The tube 43 has no anode in the accepted sense. Since both of the plates 41 and 42 are photoemissive, either the plate 41 or 42 is capable of functioning as a cathode. The surfaces 44 and 45 of the plates 41 and 42, respectively, of the tube 43 emit some electrons when subjected to light energy. The emitted electrons form a space charge near the surfaces 44 and 45 of the plates 41 and 42 as long as light is present.

In the absence of an external circuit bias, if both surfaces 44 and 45 receive equal amounts of radiation simultaneously, the space charge will be essentially equal and no current flow in an external circuit will occur; however, if one plate 41 or 42 receives a greater amount of radiation than the other plate 42 or 41, the space charge adjacent to the plate 41 or 42 receiving the greater amount of radiation will be of greater density and the electron flow will take place between surfaces 44 and 45 of the plates 41 and 42, respectively, causing a current flow in an external circuit connected electrically between individual wires 47—47 extending alongside each of the plates 41 and 42. In the absence of an external circuit bias between the two plates 41 and 42, such a tube 43 will function as a differential sensor with the polarity and magnitude of the voltage in the external circuit connected to the individual wires 47—47 being a function of the difference in the radiation incident on the two plates 41 and 42.

The differential operation of the tube 43 produces a DC signal which is either positive or negative depending on the pattern of the radiation incident on the plates 41 and 42. The magnitude of the voltage of the DC signal is proportional to the difference in the intensity of this incident energy. The DC signal is applied to the grid of a tube 48 (FIG. 8) through a capacitor 49 for further amplification of the signal. In essence, the single tube 43 can serve the purpose of two conventional phototubes, but does so in a novel manner since only one single load resistor 55 of a relatively high value is required. In conventional electro-optical color-discriminating devices requiring two phototubes, a pair of load resistors are required; however, high value resistors of this type used in photocell circuits with very low signal levels can become extremely unstable and finding a matched pair of resistors with identical aging characteristics is highly improbable.

The range of spectral sensitivity of the cathode materials extends for varying portions of the ultraviolet, visual, and infrared spectra according to the type and treatment of the cathode. The magnitude of the sensitivity as well as the position of the maximum or peak sensitivity is a function of the frequency of the incident radiation. For this reason, the spectral response curves for photodetectors are universally referenced to a particular radiation source, namely, that it is produced by a tungsten filament operating at approximately 2800° K.

Figure 4:
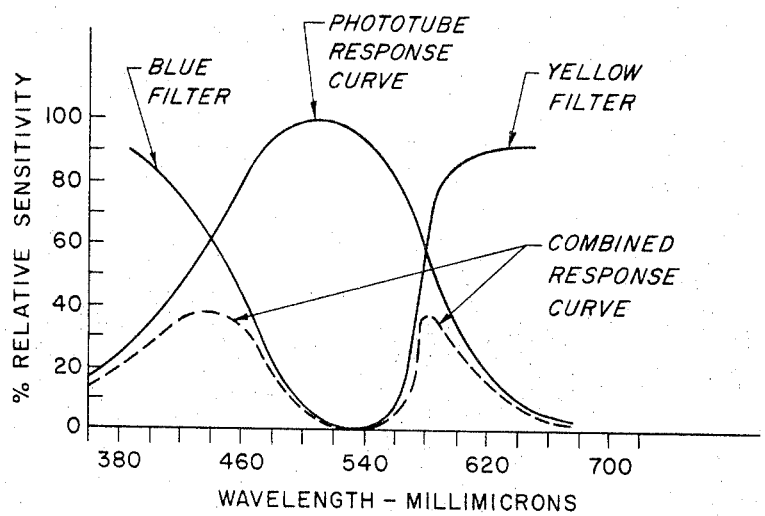
FIG. 4 is a set of curves illustrating the combined responses of the cathodes of the phototube and the filters.

The particular curve shown in FIG. 4 is known as an S-4 response and is representative of a photoplate compound of cesium and antimony illuminated with radiant energy from a tungsten filament operated at 2800° K. The particular combination produces a response curve which approximates that of a human eye but is somewhat broader at the lower percentages of response, thus, such a combination is acceptable for general use throughout the visual spectrum.

The color-sensing head 26 is sensitive to color, and the spectral response curve is a graphical relationship between the wave length or frequency of a given quantity of incident radiation and the photoelectric current (output) that is produced. It becomes necessary then, to generate a frequency band which can be directed onto the photoplate in some predetermined manner so that the electrical signal which is extracted from the detector can in some way be identified with the sample of material that one wishes to identify.

A single filter or a filter combination can be used to perform this function. The optical filters 37 and 38 permit the passage of a given frequency and reject other frequencies. Since these filters 37 and 38 actually perform the discriminating function of the system, they must be selected with considerable discretion. As a result of recent developments in the technology of thin-film deposition, it is possible to provide optical filters which are capable of generating nearly monochromatic or single frequency light with transmittance in excess of ninety percent. However, it must be remembered that the quantity of energy contained in such a narrow band would be very small and as such generally is not considered for applications of this nature. Therefore, a compromise on the spectral purity for the sake of obtaining sufficient radiant energy to operate a color-sensing head 26 at a satisfactory signal to noise is necessary.

There are two general types of filters generally available in the various combinations of transmittance and reflectance. These range from a very narrow first-order, interference-type, multilayer filter to the relatively broad band of glass and gelatine absorption-type filters.

The relative position of the plates 41 and 42 and the filters 37 and 38 with respect to the light path is such that the energy which is transmitted by a given filter 37 or 38 will strike only that particular plate 41 or 42 which is associated with it. It is usually desirable for the junction of the two filters 37 and 38 to be parellel and coincident with the junction of the plates 41 and 42. Departures from this condition will decrease the magnitude of the generated pulse since the radiant energy passing through any one of the filters 37 or 38 will not be totally confined to its associated plate 41 or 42.

Since only two of the six colored conductors 16—16 of the telephone cord 10 are of interest, it is possible to associate the color of one conductor 16 with one polarity, and the color of the other conductor 16 with the opposite polarity. The light-frequency characteristics of the insulating compounds used on the conductors 16—16 have known spectral responses and appear in graphical form in FIG. 6 as a plot of frequency versus reflectance. The spectral response characteristic of a particular color of the insulating compounds is a function of the chemistry of the raw materials of the compounds and remains substantially constant from batch to batch and thus constant for corresponding conductors 16—16 of the various cords 10—10.

Figure 6:
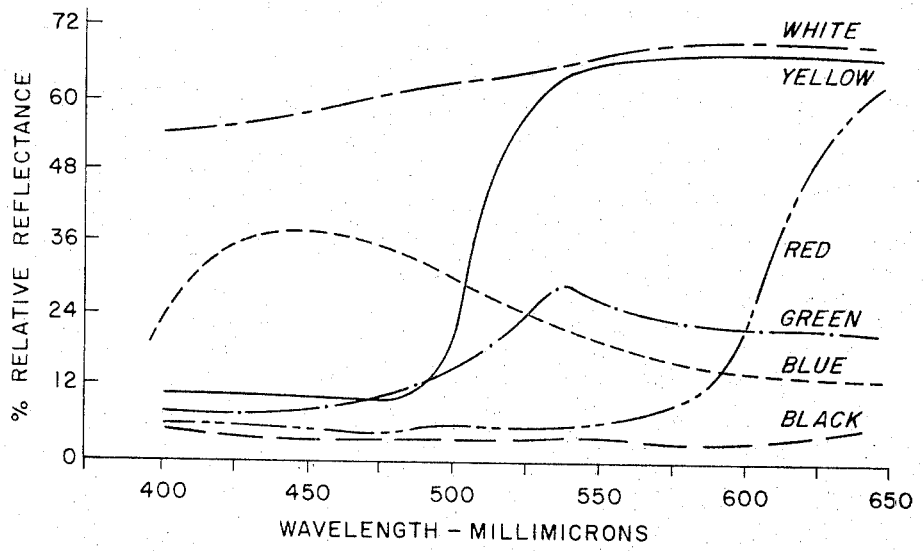
FIG. 6 is a set of curves illustrating the photo response curves for six different conductors of a cord.

Upon casual examination of the graphical representation of percent reflectance versus wave length of the insulating compounds as illustrated on FIG. 6, it is apparent that special considerations must be accorded the system to successfully exclude signals from being generated by the tube 43 when the conductors 16—16 of unwanted colors pass the color-sensing head 26. This is particularly true for the green and white conductors 16—16. As can be seen, the insulating compound on the white conductor 16 has a greater percentage of reflectance than either the blue conductor 16 or the yellow conductor 16, and would generate photoelectric signals proportional to this reflectance value.

It is apparent that if equal quantities of radiation are allowed to reach each plate 41 and 42 simultaneously, a signal balance can be affected. Inasmuch as the curve for the white conductor 16 is reasonably flat, its reflectance efficiency is substantially equal for all frequencies, assuming the incident radiation is essentially linear within the visible spectrum. By selecting the pair of discriminating filters 37 and 38 to have equal percentages of transmittance within their respective frequency range, this balanced energy condition onto the plates 41 and 42 can be affected, thereby minimizing or totally eliminating any signal from the white conductor 16.

The green conductor 16 contains substantial percentages of those frequencies which comprise both the blue conductor 16 and the yellow conductor 16. Consequently, the pass band of the two filters 37 and 38 must be of sufficient width to encompass equal percentages of those frequencies comprising the green conductor 16 but which are also common to the blue and yellow conductors 16—16. The percent of reflectance from the black conductor 16 for all frequencies throughout the visible spectrum is substantially below the level required to produce a pulse of sufficient magnitude to be effective.

A limited degree of color selectivity can be affected by proper selection of the photosensitive material on the plates 41 and 42 which makes up the tube 43. As illustrated in FIG. 4, a combination of cesium and antimony on the plates 41 and 42 produces a bell-shaped response curve which is symmetrical about a frequency of approximately 530 millimicrons and exhibiting sharp cut-off characteristics below 480 and above 600 millimicrons. This particular tube 43 is, for all practical purposes, insensitive to those frequencies which comprise the red conductor 16. Therefore, the tube 43 will exhibit only minor response to the red conductor 16. The tube 43 can, therefore, act in its own capacity in rejecting the red conductor 16.

The filters 37 and 38 by nature of their optical and mechanical characteristics isolate a frequency band of sufficient width and magnitude to be commensurate with overall system requirements. As mentioned before, a limited degree of color selectivity is accomplished with proper choice of material on the surfaces 44 and 45 of the tube 43. Further, color selectivity is affected by virtue of the physical placement of the filters 37 and 38 and tube 43 in the light path. Complete cancellation of unwanted signals from the remaining conductors 16—16 cannot be totally affected by the selection of the filters 37 and 38 and the tube 43 simply because of the marked overlap of frequencies in this particular group of conductors 16—16.

The color-identification information generated by the color-sensing head 26 is stored in a logic-storage circuit, illustrated in FIGS. 7 and 8 and designated generally by the numeral 50. The color-identification information is extracted from the logic circuit 50 subsequently to permit loops of different lengths to be pulled in the blue and yellow conductors 16—16 in a loop-pulling station (not shown) in the cord-processing apparatus 20.

The logic-storage circuit 50 is made up of two different channels, designated generally by the numerals 51 and 52. One of the channels 51 of the logic circuit 50 is associated with the blue conductor 16 and the other channel 52 is associated with the yellow conductor 16. The logic circuit 50 is provided to store information being generated as a result of the particular orientation of the conductors 16—16 of each of the cords 10—10 passing through the conductor-counting and color-sensing station 19, to store the information while each of the associated cords 10—10 passes through the next succeeding station (not shown), and permit the information to be removed from the logic circuit 50 in a second succeeding loop-pulling station. Therefore, each channel 51 and 52 is provided with three stepping switches, designated generally by the numerals 56, 57, and 58 and 66, 67, and 68, respectively, and which may be in the form of cold-cathode counting tubes.

All of the stepping switches 56, 57, 58, 66, 67, and 68 are cycled by a common stepping switch, designated generally by the numeral 69 (FIG. 8). The common stepping switch 69 is controlled in timed relationship with the movement of conductor-fanning combs 22—22 of the cord-processing apparatus 20 by a cam 71 or other appropriate means. Each of the stepping switches 56, 57, 58, 66, 67, and 68 is provided with six active contacts 72—72. The corresponding contacts 72—72 on each of the stepping switches 56, 57, 58, 66, 67, and 68 in each of the channels 51 and 52 may be selectively connected to a common relay 73 which is connected to an associated conductor pulling hook 74 positioned in the loop-pulling station of the cord-processing apparatus 20 by a set of normally open contacts 76—76 associated with relays 77, 78, 79, 82, 83, and 84.

Each of the relays 77, 78, 79, 82, 83, and 84 is also provided with a normally open contact 86 in series with a stepping solenoid 87 of the associated stepping switches 56, 57, 58, 66, 67, or 68. Each of the relays 77, 78, and 79 is also provided with a normally open contact 88 which is in series with a single reset solenoid 89 associated with each pair of common stepping switches 56–66, 57–67, or 58–68 in both channels 51 and 52 of the logic-storage circuit 50 for resetting the pair of stepping switches associated with the cord entering the conductor-counting and color-sensing station 19 in preparation for subsequent conductor-counting and color-sensing operation.

The resetting of each pairs of the stepping switches 56–66, 57–67, and 58–68 occurs after the associated reset solenoids 89—89 of the stepping switches are energized and then deenergized. Each of the stepping reset solenoids 89—89 is also provided with a manual reset button 91. The relay 78 is also provided with a normally open contact 92 (FIG. 8) which is connected in series with a reset solenoid 93 of the cycling stepping switch 69 which resets the stepping switch 69 at the end of each cycle of logic circuit 50.

Scanning of the conductors 16—16 is accomplished by passing each of the conductors through the focal axis of the light source 28. Light from the light source 28 is directed at the light-sensitive resistor 27 by the lens system (not shown). The movement of the individual conductors 16—16 through the focal axis of the path of the light from the light source 28 causes a reduction in the amount of the light reaching the resistor 27 which, in turn, causes the resistivity of the resistor 27 to increase and change the bias on the base of a transistor (not shown). The change in the bias of the base of the transistor causes the transistor to conduct and produce a counting pulse which is amplified and applied selectively to the solenoids 87—87 of the stepping switches 56, 57, 58, 66, 67, and 68.

The then active stepping switches 56, 57, 58, 66, 67, or 68 will step one step for each counting pulse supplied by the conductor counter 24. The pulse-counting operations of the channels 51 and 52 are terminated when the negative and positive color-identification pulses are generated by the color-sensing head 26 as a result of the respective blue and yellow conductors 16—16 passing the head 26.

The mechanical positioning of the resistor 27 and the tube 43 along with the light source 28 and the lamp 47 is such that the counting pulse occurs a predetermined time (approximately 10 milliseconds) before the tube 43 produces a color-identification pulse for the same conductor 16. This alignment is necessary for the desired operation of the overall system. In order to provide the desired switching speed, it may be necessary to use cold-cathode type counting tubes for the stepping switches 56, 57, 58, 66, 67, and 68.

The positive and negative pulses associated with the yellow and blue conductors 16—16, respectively, are amplified by a preamplifier 96 (FIG. 8) and applied to the single input channel of a pulse-clipper-separator unit, designated generally by the numeral 97 in FIG. 8 and illustrated in specific detail in FIG. 10. The purpose of the pulse-clipper-separator unit 97 is to separate, clip, and amplify the negative and positive pulses generated by the color-sensing head 26 and produce two negative pulses of substantially the same magnitude. Therefore, pulse-clipper-separator unit 97 takes the positive and negative pulses generated in the color-sensing head 26, which are passed through the preamplifier into a single channel input to the unit and transforms the positive and negative pulses into a two-channel output signal comprising two separate negative pulses. With proper phasing, the two negative output pulses of the unit 97 are of substantially the same magnitude and each pulse represents the pulses generated by the color-sensing head 26 as a result of the head observing the respective blue and yellow conductors 16—16.

Referring now to FIG. 10, the output signals are both applied to the base of the transistor 98 which has a grounded collector stage and is of unity gain. This transistor 98 is utilized to match the impedance of the two signals generated by the color-sensing head 26; however, no reversal of the signals occurs at this stage. The output signals from the emitter of the transistor 98 branches off into two directions. The output signals from the emitter of the transistor 98 are applied to the base of a NPN-type transistor 99 which has a cut off bias. However, the effect of the cutoff bias on the NPN-type transistor 99 is that negative pulses will not produce a current flow in the collector of the transistor 99. Therefore, the only signal which will have any effect on the transistor 99 is the positive signal generated by the tube 43 as a result of the light reflected from the yellow conductor 16.

The positive signal associated with the yellow conductor 16 will be amplified and inverted by the transistor 99. The transistor 99 will also eliminate minor positive pulses or noise signals of less than approximately ½ volt because signals of less than that level will be of insufficient magnitude to cause current flow in the collector of the transistor 99. Further clipping of the pulse associated with the yellow conductor 16, as it appears on the collector of the transistor 99, is accomplished by the use of a Zener diode 101. A capacitor 102 is connected between the Zener diode 101 and ground to bypass high frequency noise signals. The clipped portion of the pulse associated with the yellow conductor 16, as removed from the pulse-clipper-separator unit 97, is free of all noise or minor pulses. A potentiometer 103 is provided which permits the output signal associated with the yellow conductor 16 to be varied to an optimum value of between two and three volts. The output signal is applied to a logic amplifier 106 (FIG. 8) which is overdriven. This results in a squared output pulse. Under these operating conditions, the desired degree of signal compression is attained.

Only the negative output signal from the emitter of the transistor 98 (FIG. 10), which is associated with the blue conductor 16, may pass to the base of a transistor 107 through a diode 108. The diode 108 clips the negative pulse so that approximately an 0.2-volt signal is impressed on the base of the transistor 107. The transistor 107 is a PNP-type and has a cutoff bias so that it will only respond to the negative pulse associated with the blue conductor 16.

The negative pulse associated with the blue conductor 16, which is applied to the base of the transistor 107, is amplified to approximately one volt and inverted by the transistor 107. This pulse produced by the transistor 107 is applied to the base of a NPN-type transistor 111 which also has a cutoff bias so that only a positive input pulse of a relatively high value will produce current flow in the collector of the transistor 111. The output signal from the collector of the transistor 111, which is associated with the blue conductor 16, is clipped further by a Zener diode 112, and a potentiometer 113 is provided to permit the negative output signal associated with the blue conductor 16 to be adjusted to the same optimum value of the negative output signal associated with the yellow conductor 16 which is between two and three volts. A capacitor 104 is connected between the Zener diode 101 and ground to bypass high frequency noise signals.

The output pulse associated with the blue conductor 16 is applied to an overdriven logic amplifier 114 (FIG. 8) which squares off the signal associated with the blue conductor 16 and provides the desired degree of compression of the signal. The amplified output signal associated with the blue conductor 16 is applied to the base of a transistor 121 which is provided for a collector-ground-emitter output operation. The output of the transistor 121 is connected to the base of a PNP-type transistor 122. When the signal associated with the blue conductor 16 is applied to the base of the transistor 122, the coils of relays 123 and 124 are energized and are held energized by the closing of a normally open contact 126 associated with the relay 124 until the circuit is reset by a normally closed switch 127 actuated by the cam 71 or manually by a switch 120.

The energization of the relay 123 causes a normally open contact 125 associated therewith to close which places a resistor 135, of a relatively high value, between a line 130, connected to the output of the conductor counter 24, and ground. The resistor 135 drops the voltage applied to the stepping relays 87—87 of the switches 56, 57, and 58 by the counter 24 sufficiently so that the stepping switches 56, 57, and 58 will not step as subsequent conductors 16—16 of the group of conductors of the particular cord 10, passing between the light source 28 and the resistor 27, cause pulses to be generated in the conductor counter 24.

The output pulse associated with the yellow conductor 16 is applied to the base of a transistor 128. The output signal at the emitter of the transistor 128 is applied to the base of a transistor 129. When a manual operating switch, designated generally by the numeral 131, is in the left position, as illustrated in FIG. 8, the output from the collector of the transistor 129 is applied to the coils of relays 132 and 133 to energize the relays 132 and 133. The energization of the relay 133 causes a normally open contact 134 associated with the relay 133 to close and hold the relay 133 energized until the circuit is reset by the cam operated switch 127 or the manually operated switch 120. The energization of the relay 132 results in the closing of a normally open contact 136, associated therewith, which inserts a resistor 137, of a relatively high value, between the output of the counter 24 and ground. This results in the voltage in the signal generated by the counter 24 and applied to the stepping switches 66, 67, and 68 through a line 138 being dropped to prevent the stepping switches 66, 67, and 68 from stepping as any subsequent conductors 16—16 of the particular cord 10 pass between the light source 28 and the resistor 27.

In this way, the pulse-counting operation of each of the stepping switches 56, 57, or 58 and 66, 67, or 68 is terminated when a color-identification pulse is generated by the tube 43 as a result of the associated blue and yellow conductors 16—16, respectively, being advanced through the conductor-counting and color-sensing station 19. For example, if a negative color-identification pulse is generated by the phototube 43, following the number three counting pulse, the operation of the then active stepping switches 56, 57, or 58 associated with the blue conductor will be terminated on the number three counting contact 72 of the active stepping switch 56, 57, or 58. In this way, the particular slots 21—21 in the combs 22—22 in which the blue conductor 16 is positioned in detected and the information is stored in the logic circuit 50. The relay 73 associated with the number three contact 72 of the stepping switch 56, 57, or 58 associated with the particular cord 10 will be operated subsequently to cause the associated hook 74 to move and pull a loop in the associated conductor 16 when the particular cord 10 reaches the subsequent loop-pulling station.

Safeguards against irregular operation have been incorporated into the circuit 50 in the form of "fail-safe" provisions. The circiut 50 is required to perform the two main functions for each operation. It must count the desired number of conductors 16—16, six in the case of one specific type of cord 10, and it must have utilized only one positive and one negative pulse in identifying the yellow and blue conductors 16—16 of the particular cord 10. Any departure whatsoever from these requirements will cause the system to indicate a malfunction. For ease of illustration, an indicator lamp 141 (FIG. 8) is used to indicate when malfunction occurs. This is accomplished by providing a stepping switch, designated generally by the numeral 142, which may be in the form of a cold-cathode counting tube, and a relay 143 which may be connected selectively to a desired one of a plurality of contacts 144–144 of the stepping switch by movement of the switch 131 to the right or left, as illustrated in FIG. 8, depending on the number of conductors 16–16 in the cord 10 under test.

The relay 143 is provided with a normally open contact 146, which is connected in series with normally open contacts 147 and 148 associated with the relays 124 and 133, respectively, and the indicator lamp 141. Accordingly, if all three of the contacts 146, 147, and 148 are not closed to connect the lamp 141 between ground and a bus bar 151, the lamp 141 will not be energized to indicate that the color-sensing head 26 and conductor counter 24 are not functioning properly and the right number of conductors 16–16 are not present. The stepping switch 142 is reset by a relay 145 which is selectively energized at the end of each conductor-counting and color-sensing cycle by a normally open, instantaneously-opening time-to-close contact 150 associated with the relay 77, 78, or 79.

Further, the circuit 50 is provided with a relay 152, which is energized if two or more negative pulses are generated by the tube 43. This is accomplished by providing a transistor 153 which has a predetermined impedance, in the form of a resistor 154 and a capacitor 156, connected to the collector of the transistor 153 to provide an emitter cutoff bias delay of approximately seven milliseconds. The relay 152 associated with the transistor 153 will be energized when two or more negative pulses appear on the base of the transistor 153. The first negative pulse will not operate the relay 152 because of the approximately seven-millisecond emitter cutoff bias occurring between the time initial pulse starts and a normally closed contact 157 associated with the relay 152 closes. When the relay 152 operates momentarily with the second negative pulse, the normally closed contact 157 associated therewith opens and removes the ground connection from the relays 124 and 133 which, in turn, results in the normally open contacts 147 and 148 associated therewith being opened to break the continuity in the circuit containing the lamp 141.

When it is desirable to use the color-sensing head 26 and conductor counter 24 for identifying two white conductors of a four-conductor cord, the switch 131 is pushed to the right, as illustrated in FIG. 8. In this position, a contact 161 will be open so that the transistor 129 will be inoperaive and the relays 132 and 133 will be connected to the collector of a transistor 162 through a contact 160. To prevent the transistor 162 from conducting when a first negative pulse is applied to the base thereof and to conduct when a second pulse is applied to the base thereof, an emitter-blocking impedance consisting of a resistor 163 and a capacitor 164 is connected to the emitter of the transistor 162. This means that the relays 132 and 133 cannot operate until the contact 126 associated with the relay 124 closes thus removing the blocking negative voltage.

The closing of a contact 166 of the manual switch 131 connects the blocking bias network for the transistor 153 to one side of the relay 133 so that the transistor 153 and relay 152 are now connected in the circuit 50 to detect a third negative pulse which may occur because of stray currents or a third white conductor. If this occurs, the relay 152 is momentarily energized and will open the normally closed contact 157 associated therewith to unlock any of the relays 123, 124, 132, and 133 which are energized. This will cause the lamp 141 to be extinguished indicating a malfunctioning of the circuit 50 or an unsatisfactory cord. If less than two negative pulses are detected, the failure of both the relays 124 and 133 to operate will also prevent the lamp 141 from lighting up.

It is to be understood that the above-described arrangements are simply illustrative of the principles of the invention. Other arrangements may be devised by those skilled in the art which will embody the principles of the invention and fall within the spirit and scope thereof.

What is claimed is:

1. A photoelectric color-discriminating system for identifying media of different colors, which comprises:
    an unbiased phototube including two photoemissive electrodes having opposed cooperating surfaces designed to have light rays impinge thereon and which emit electrons in proportion to the magnitude of the light energy striking the electrode surfaces, either electrode acting as an anode while the opposite electrode acts as a cathode depending on the relative amount of incident light on the electrodes, an evacuated vessel enclosing the electrodes, and leads connecting electrically to the electrodes and projecting from the evacuated vessel;
    a light source to provide a wide range of light frequencies containing at least all of the frequencies characteristically reflected by the media being sensed;
    means for causing light rays from the media being sensed to move lengthwise of the plates of the phototube; and
    means for causing varying intensities of light to shine through the evacuated vessel and onto different electrodes of the phototube depending on the frequency characteristics of the light from the colored media being selected so that currents are generated by the phototube, the polarity and magnitude of the current generated by the phototube being proportional to the difference in the magnitude of the difference of light energy shining on the two electrodes and indicative of the color of the media being selected.

2. A photoelectric color-discriminating system for identifying media of different colors, which comprises:
    an unbiased phototube including two symmetrical light-sensitive electrodes having opposed cooperating surfaces designed to have light rays impinge thereon and which emit electrons in proportion to the magnitude of the light energy striking the electrode surfaces, either electrode acting as an anode while the opposite electrode acts as a cathode depending on the relative amounts of incident light on the electrodes, an evacuated vessel enclosing the electrodes, and leads connecting electrically to the electrodes and projecting from the evacuated vessel;
    a light source to provide a wide range of light frequencies containing at least all of the frequencies characteristically reflected by the media being sensed;
    means for causing light rays from the media being sensed to move lengthwise of the plates of the phototube; and
    means for causing varying intensities of light to shine through the evacuated vessel and onto different electrodes of the phototube depending on the frequency characteristics of the light from the colored media being selected so that currents are generated by the phototube, the polarity and magnitude of the current generated by the phototube being proportional to the difference in the magnitude of the difference of light energy shining on the two electrodes and being indicative of the color of the media being selected.

3. A photoelectric, color-identification system for identifying media of different colors, which comprises:
    an unbiased phototube having two plates having photoemissive opposed surfaces facing each other, each of the plates being capable of acting as an anode at one time and a cathode at another time depending upon the relative intensity of the illumination incident on one of the plates as compared to the amount of light incident on the other plate;

means externally of the phototube for connecting the plates together electrically so that electrons emitted by one of the plates are received by the other plate to cause an external current flow in a direction solely dependent on the relative intensity of the light incident to the plates;

a separate light filter positioned in front of each of the plates, the filters each being designed to pass different amounts of light of different preselected colors corresponding to the media of the particular colors to be detected;

means for causing relative movement between the phototube and the colored media to be identified; and a light source for directing illumination of a predetermined frequency band to the media to be identified and from the media to be identified to the optical filters so that if the light from one of the colored medium which is directed onto the filters is of the frequency band passed substantially more readily by one of the filters than the other, the corresponding plate becomes a cathode of the phototube and a signal having a distinctive polarity is generated by the phototube, the polarity and magnitude of the signal generated by the phototube being indicative of the color of the associated medium observed by the system.

4. A photoelectric, color-identification system for identifying objects of different colors, which comprises:

an unbiased phototube having two photoemissive plates extending at a predetermined angle with respect to each other, each of the plates being capable of acting as an anode at one time and a cathode at another time depending upon the relative intensity of the illumination incident on one of the plates as compared to the amount of light incident on the other plate;

means for connecting the plates electrically so that electrons emitted by one of the plates are received by the other plate to cause a current flow in a direction solely dependent on the relative intensity of the light incident to the plates;

a separate light filter positioned in front of each of the plates, the filters each being designed to pass a relatively narrow frequency band corresponding to a separate color of an object to be detected;

means for causing relative movement between the phototube and the objects to be identified; and a light source for directing illumination of a predetermined frequency band to the objects to be identified and from the objects to be identified to the optical filters so that if the light from one of the objects which is directed onto the filters is of the frequency band passed substantially more readily by one of the filters than the other, the corresponding plate becomes a cathode of the phototube and a signal having a distinctive polarity is generated by the phototube, the polarity and magnitude of the signal generated by the phototube being indicative of the color of the associated object observed by the system.

5. A photoelectric, color-selecting system for selecting two colored media from a plurality of colored media, which comprises:

a single phototube which includes two symmetrical light-sensitive electronic electrodes having surfaces supported in opposed relationship and designed to have rays of light directed thereon, the electrodes being positioned in the phototube at right angles to each other with the electrodes converging toward a line parallel to the longitudinal axis of the phototube, both electrodes emitting electrons when subjected to radiant energy to form space charges near the surfaces of the electrodes, either electrode functioning as an anode or cathode with equal efficiency depending on the difference in the amount of light incident on the opposed surfaces of the electrodes and the output of the phototube being proportional to the difference in the space charge of the two electrodes;

a light source for directing light incident on the surface of the colored media, the light from the light source containing rays having at least the same rate of vibrations required for the spectral colors of the media to be selected;

means for causing relative movement between the colored media and the phototube, the surface of the individual medium reflecting light toward the phototube at successive times; and light filters having selected transmission levels in their respective pass bands which will permit substantially different amounts of radiant energy to be projected from the colored media to be selected onto the different electrodes and will permit substantially equal amounts of radiant energy to be projected onto the electrodes from the remaining colored media being observed so that signals of desired magnitudes and polarities will be generated by the phototube for colored media to be selected and any current generated by the phototube for the remaining colored media being observed will be below a predetermined magnitude.

6. A photoelectric, color-selecting system for selecting two colored media from a plurality of colored media, which comprises:

a single phototube which includes two symmetrical light-sensitive electrodes having opposed surfaces positioned in the phototube at a predetermined angle with respect to each other, the opposed surfaces of the electrodes being contained in planes converging toward a line parallel to the longitudinal axis of the tube, the included angle between the electrodes being varied to provide a maximum photoelectric effect, and photoemissive material covering the opposed surfaces of the electrodes, the spectral sensitivity of the photoemissive material on the electrodes being a predetermined range, both electrodes emitting electrons when subjected to radiant energy to form space charges near the surfaces of the electrodes, either electrode functioning as an anode or cathode with equal efficiency depending on the difference in the amount of light incident on the opposed surfaces of the electrodes and the output of the phototube being proportional to the difference in the space charge of the two electrodes;

a light source for directing light incident on the surface of the colored media, the light from the light source containing rays having at least the same rate of vibrations required for the spectral colors of the media to be selected;

means for causing relative movement between the colored media and the phototube, the surface of the individual medium reflecting light toward the phototube at successive times; and light filters having selected transmission levels in their respective pass bands which will permit substanitally different amounts of radiant energy to be projected from the colored media to be selected onto the different electrodes and will permit substantially equal amounts of radiant energy to be projected onto the electrodes from the remaining colored media being observed so that signals of desired magnitudes and polarity will be generated by the phototube for colored media to be selected and any current generated by the phototube for the remaining colored media being observed will be below a predetermined magnitude.

7. A photoelectric, color-sensing system, which comprises:

a photoelectric cell which includes two cooperating electrodes which are substantially identical in construction and having adjacent photoemissive surfaces, the edges of the electrodes being more widely spaced on one side than the other side to permit light to enter between the electrodes and strike relatively large areas of the electrodes, both electrodes emitting electrons when subjected to light, the emitted electrons forming space charges near the surfaces of the electrodes which remain as long as the light is incident on the electrodes, any illumination differential existing between the two plates causing different space charge densities to exit and an interchange of electrons to occur resulting in the generation of a direct current, the magnitude and polarity of the direct current being a function of the difference in the relative intensity of the radiant energy incident to the two electrodes;

means for directing light incident on the surface of the colored media to be sensed, which light contains rays having at least the same rates of vibration required for the spectral colors of the media to be sensed;

a lens system for collecting the light from specific areas of the media to be sensed and to direct the light rays from the media toward the electrodes of the phototube; and discriminating light filters, the position and characteristic of the discriminating filters being such that light of a certain frequency band passes through one of the filters and is incident on one of the electrodes of the phototube and light of another frequency band shining through the other filter is incident on the other electrode of the phototube and some of the light shining through the filter associated with one of the electrodes being permitted to shine onto the other electrode to trim the photodetector system by bringing the signal levels generated by the phototube into proper relationship with one another.

8. A photoelectric, color-sensing system, which comprises:

a photoelectric cell which includes two cooperating electrodes having adjacent photoemissive surfaces, the edges of the electrodes being more widely spaced on one side than the other side to permit light to enter between the electrodes and strike relativley large areas of the electrodes, both electrodes emitting electrons when subjected to light, the emitted electrons forming space charges near the surfaces of the electrodes which remain as long as the light is incident on the electrodes, any illumination differential existing between the two plates causing different space charge densities to exist and an interchange of electrons to occur resulting in the generation of a direct current, the magnitude and polarity of the direct current being a function of the difference in the relative intensity of the radiant energy incident to the two electrodes;

means for directing light incident on the surface of the colored media to be sensed, which light contains rays having at least the same rates of vibration required for the spectral colors of the media to be sensed;

means for directing the light rays from the media toward the electrodes of the phototube; and discriminating light filters, the position and characteristic of the discriminating filters being such that light of a certain frequency band passes through one of the filters and is incident on one of the electrodes of the phototube and light of another frequency band shining through the other filter is incident on the other electrode of the phototube.

9. A color-sensitive photoelectric system for identifying certain colored articles from a particular group of colored articles and furnishing the information to respective work stations in which specific operations are performed on the individually identified articles, which comprises:

a color-sensing head for monitoring the light frequency characteristics of the articles and individually selecting two different colored articles from a larger group of variously colored articles which includes a single unbiased phototube including two symmetrical photoemissive electrodes having surfaces supported in opposed relationship and designed to have rays of light directed thereon, the electrodes being positioned in the phototube at right angles to each other with the electrodes converging toward a line parallel to the longitudinal axis of the phototube, both electrodes emitting electrons when subjected to radiant energy to form space charges near the surfaces of the electrodes, either electrode functioning as an anode or cathode with equal efficiency depending on the difference in the amount of light incident on the opposed surfaces of the electrodes and the output of the phototube being proportional to the difference in the space charge of the two electrodes, in absence of a bias on the electrodes of the phototube space charge being of the greatest density adjacent to the electrode receiving the greatest quantity of radiant energy so that the electrodes will assume a particular anode-cathode relationship and an electron interchange between the electrodes of the phototube will cause a current flow externally of the phototube;

means for moving the individual colored articles past the color-sensing head in equally spaced relationship;

means for producing a relatively wide spectrum of light which includes the portions of the electromagnetic spectrum having the same rates of vibration as the spectral colors selectively reflected by the variously colored articles and for directing the light onto the surfaces of the colored articles moving past the color-sensing head, the surfaces of the individual articles reflecting light into the color-sensing head;

means for causing the light rays from the monitored articles to be directed toward areas of the photoemissive electrodes, which are symmetrical about the line of convergence of the electrodes, to provide a substantially equal dispersion of light rays from unwanted articles over the surfaces of the electrodes; and a pair of filters positioned adjacent to each other in the path of the light rays from the articles being sensed to the electrodes of the phototube to permit light to shine through the filters in two contiguous paths, a junction between the two paths of light being parallel to and coincident with the cathode junction, the filters permitting different amounts of light from articles of predetermined colors to strike the different electrodes of the phototube so that currents are generated by the phototube, which currents have magnitudes and directions significant of the predetermined colored articles to be selected.

10. A photoelectric, color-discriminating system for identifying two different colored conductors from a multiplicity of individually insulated, color-coded conductors, which comprises:

an unbiased, frequency selective phototube including an evacuated vessel, two symmetrical light-sensitive plates supported in the vessel and designed to have rays of light directed thereon, either plate acting as an anode while the opposite plate acts as a cathode depending on the relative instantaneous amounts of incident light on the plates, lead wires for supporting the plates in opposed relationship with one edge of one of the plates being positioned adjacent to but spaced from one edge of the other plate, the opposite edges of the plates being spaced a greater distance from each other to form an opening through which incident light rays may be dispersed over the opposed surfaces of both of the plates, and photoemissive material covering the opposed surfaces of the plates, which material under the influence of light causes electrons to be emitted, frequency selectivity being inherent in the coated plates by virtue of the composition and treatment of the surface thereof, the phototube having a sharp cutoff above a predetermined frequency so that the phototube will of its own capacity eliminate the effect of certain colored conductors on the color-discriminating system, the polarity and magnitude of the current generated by the phototube being proportional to the instantaneous difference in the magnitude of light energy impinging on the electrodes;

means for moving the individually color-coded conductors past the phototube in equally spaced, parallel relationship;

an incandescent lamp containing a helically wound tungsten filament of a predetermined diameter and length;

means for heating the filament of the lamp to a predetermined temperature;

a lens system for focusing the image of the filament along the longitudinal axis of the individual conductors and for distributing the light rays from the heated filament on the conductors to be sensed so that a substantially uniform concentration of light energy will be present on the observed portions of the conductors;

a pair of discriminating optical filters positioned between the lamp and the phototube;

an optical system focused on successive conductors to collect light rays that are reflected from the conductors, to shape the reflected light pattern and to direct the light rays from the conductors onto the pair of discriminating optical filters and for causing the light from the conductors to move lengthwise of the plates; the discriminating filters permitting light rays of one frequency band containing frequencies characteristically reflected by a given colored conductor to fall on one of the plates of the phototube and restricting a substantial amount of the light of that frequency band from falling on the second plate of the phototube so that a pulse of a given polarity will be generated by the phototube when light rays of the first frequency band are directed toward the phototube, the discrimiinating filters permitting light from a second frequency band containing frequencies characteristically reflected by a different colored conductor to fall on the second plate and restricting a substantial amount of the light of the second frequency band from falling on the first plate so that a pulse of the opposite polarity is generated when light from the second frequency band is directed toward the phototube, the difference in the quantities of radiant energy directed simultaneously onto both plates of the phototube by the discriminating filters when light rays of other selected frequency bands are directed toward the phototube being relatively small to prevent currents of a predetermined magnitude from being generated by the phototube when light rays of frequency bands other than those of the first and second frequency bands are directed toward the phototube;

a photosensitive cell positioned on one side of the path of travel of the conductors;

a second light source positioned on the opposite side of the path of travel of the conductors, the second light source emitting light through the path of travel of the conductors toward the photosensitive cell, the movement of the individual conductors between the second light source and the photosensitive cell acting as shutters for the photosensitive cell, the interruption of the light beam causing an electrical signal to be generated by the photosensitive cell, the relative positions of the various elements being such that the signal generated by the photosensitive cell which is associated with a given conductor occurring a predetermined time ahead of any current generated by the phototube which is associated with the color discriminating function of that particular conductor;

a logic circuit for storing the information generated by the phototube and photosensitive cell, the logic circuit containing a cold cathode counting tube for each of the colors to be selected, the counting tube being stepped by the electrical signal generated by the photosensitive cell and the stepping of the associated counting tube being terminated when the current of a predetermined polarity and magnitude indicative of a predetermined colored conductor is generated by the phototube;

means for extracting the stored information from the logic circuit when the respective conductors arrive at a predetermined position; and means for detecting malfunctioning of the system and an excessive number of conductors of preselected colors.

11. A photoelectric, color-discriminating system for identifying two different colored conductors from successive groups of a multiplicity of individually insulated, color-coded conductors, which comprises:

an unbiased, frequency selective phototube including an evacuated vessel, two symmetrical light-sensitive plates supported in the vessel and designed to have rays of light directed thereon, either plate acting as an anode while the opposite plate acts as a cathode depending on the relative instantaneous amounts of incident light on the plates, lead wires for supporting the plates in opposed relationship with one edge of one of the plates being positioned adjacent to but spaced from one edge of the other plate, the opposite edge of the plates being spaced a greater distance from each other to form an opening through which incident light rays may be dispersed over the opposed surfaces of both of the plates, and photoemissive material covering the opposed surfaces of the plates, which material under the influence of light causes electrons to be emitted, frequency selectivity being inherent in the coated plates by virtue of the composition and treatment of the surface thereof, the phototube having a sharp cutoff above a predetermined frequency so that the phototube will of its own capacity eliminate the effect of certain colored conductors on the color-discriminating system, the polarity and magnitude of the current generated by the phototube being proportional to the instantaneous difference in the magnitude of light energy impinging on the electrodes;

means for moving the individually color-coded conductors past the phototube in equally spaced, parallel relationship;

an incandescent lamp containing a helically wound tungsten filament of a predetermined diameter and length;

means for heating the filament of the lamp to a predetermined temperature;

a lens system for focusing the image of the filament along the longitudinal axis of the individual conductors and for distributing the light rays from the heated filament on the conductors to be sensed so that a substantially uniform concentration of light energy will be present on the observed portions of the conductors;

a pair of discriminating optical filters positioned between the lamp and the phototube;

an optical system focused on successive conductors to collect light rays that are reflected from the conductors, to shape the reflected light pattern and to direct the light rays from the conductors onto the pair of discriminating optical filters and for causing the light from the conductors to move lengthwise of the plates; the discriminating filters permitting light rays of one frequency band containing frequencies characteristically reflected by a given colored conductor to fall on one of the plates of the phototube and restricting a substantial amount of the light of that frequency band from falling on the second plate of the phototube so that a pulse of a given polarity will be generated by the phototube when light rays of the first frequency band are directed toward the phototube, the discriminating filters permitting light from a second frequency band containing frequencies characteristically reflected by a different colored conductor to fall on the second plate and restricting a substantial amount of the light of the second frequency band from falling on the first plate so that a pulse of the opposite polarity is generated when light from the second frequency band is directed toward the phototube, the difference in the quantities of radiant energy directed simultaneously onto both plates of the phototube by the discriminating filters when light rays of other selected frequency bands are directed toward the phototube being relatively small to prevent currents of a predetermined magnitude from being generated by the phototube when light rays of frequency bands other than those of the first and second frequency bands are directed toward the phototube;

a photosensitive cell positioned on one side of the path of travel of the conductors;

a second light source positioned on the opposite side of the path of travel of the conductors, the second light source emitting light through the path of travel of the conductors toward the photosensitive cell; the movement of the individual conductors between the second light source and the photosensitive cell acting as shutters for the photosensitive cell, the interruption of the light beam causing an electrical signal to be generated by the photosensitive cell; the relative positions of the various elements being such that the signal generated by the photosensitive cell which is associated with a given conductor occurring a predetermined time ahead of any current generated by the phototube which is associated with the color discriminating function of that particular conductor;

a logic circuit for storing the information generated by the phototube and photosensitive cell, the logic circuit containing two channels, each containing a plurality of stepping switches, one channel for each of the colors to be selected, a stepping switch in each channel being associated at any one time with a particular group of conductors, the stepping switches being stepped by the electrical signal generated by the photosensitive cell and the stepping of the associated stepping switches being terminated when the current of a predetermined polarity and magnitude indicative of a predetermined colored conductor is generated by the phototube;

a plurality of electrically operated elements selectively connected to associated contacts on the stepping switches to pull loops in the selected conductors when the conductors arrive at a subsequent loop-pulling station;

means for programming the stepping switches in the logic circuit so that the electrically operated elements are energized through the stepping switches associated with the particular group of conductors when the respective conductors arrive at the subsequent loop-pulling station; and means for detecting malfunctioning of the system and an excessive number of conductors of preselected colors.

12. A photoelectric, color-discriminating system for identifying colored conductors from a multiplicity of individually insulated, color-coded conductors, which comprises:

means for applying illumination of a predetermined frequency band to the conductors;

means responsive to illumination from the conductors for generating a signal, the polarity and magnitude of the signal being indicative of the color of a conductor;

means for causing reltaive movement between the conductors and the means responsive to illumination from the conductors to sequentially inspect each conductor;

a photosensitive cell positioned on one side of the path of travel of the conductors;

a second light source positioned on the opposite side of the path of travel of the conductors, the second light source emitting light through the path of travel of the conductors toward the photosensitive cell; the movement of the individual conductors between the second light source and the photosensitive cell acting as shutters for the photosensitive cell, the interruption of the light beam causing an electrical signal to be generated by the photosensitive cell; the relative positions of the various elements being such that the signal generated by the photosensitive cell which is associated with a given conductor occurs a predetermined time ahead of the generation of the current indicative of the color of that particular conductor;

a logic circuit containing two channels, each channel containing a plurality of stepping switches, one channel for each of the colors to be selected, a stepping switch in each channel being associated at any one time with a particular group of conductors, the stepping switches being stepped by the electrical signal generated by the photosensitive cell and the stepping of the associated stepping switches being terminated when the current of a predetermined polarity and magnitude indicative of a predetermined colored conductor is generated;

a plurality of electrically operated elements selectively connected to associated contacts on the stepping switches to pull loops in the selected conductors when the conductors arrive at a subsequent loop-pulling station;

means for programming the stepping switches in the logic circuit so that the electrically operated elements are energized through the stepping switches associated with the particular group of conductors when the respective conductors arrive at the subsequent loop-pulling station; and means for detecting malfunctioning of the system and an excessive number of conductors of preselected colors.

13. A photoelectric, color-discriminating system for selecting one or more colors from a media of different colors, which comprises:

a phototube having two photoemissive electrodes;

means for illuminating the media;

means for sequentially directing illumination from each individual member of said media to said phototube; and means for dividing the illumination reflected from each individual member into two distinct frequencies and for restricting each frequency to different electrodes of said phototube, the phototube generating a current in response thereto having a polarity and magnitude indicative of whether the member is of a color being selected.

References Cited

UNITED STATES PATENTS

| | | | |
|---|---|---|---|
| 1,837,365 | 12/1931 | Ives | 313—96 |
| 2,827,594 | 3/1958 | Rabinow | 315—83 |
| 3,248,549 | 4/1966 | Sanabria | 250—210 |

JAMES W. LAWRENCE, *Primary Examiner.*

W. J. SCHWARTZ, *Assistant Examiner.*